A. E. PAIGE.
SURFACING MECHANISM.
APPLICATION FILED JULY 4, 1917.
1,260,022.
Patented Mar. 19, 1918.
4 SHEETS—SHEET 2.
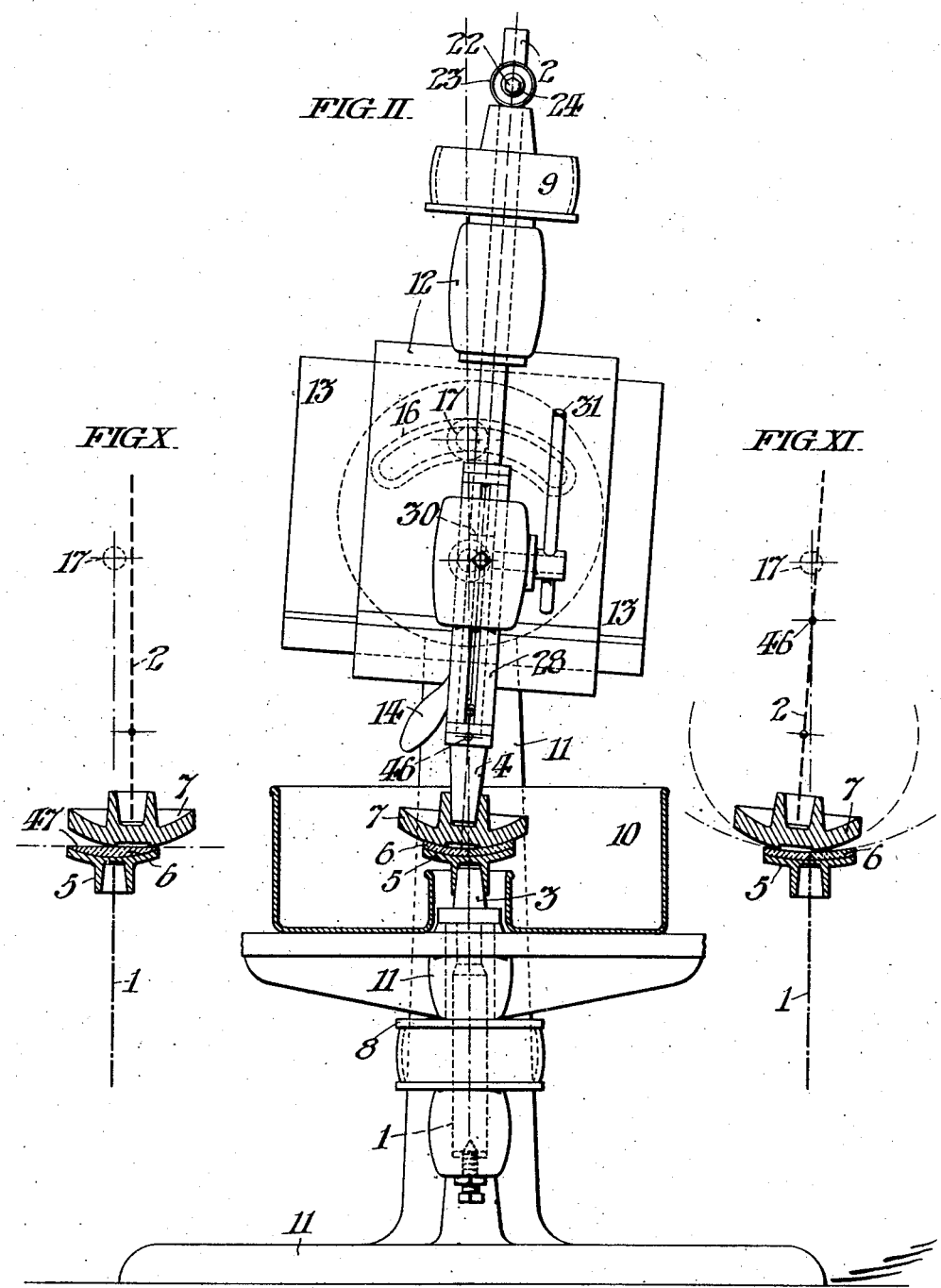
INVENTOR:
Arthur E. Paige

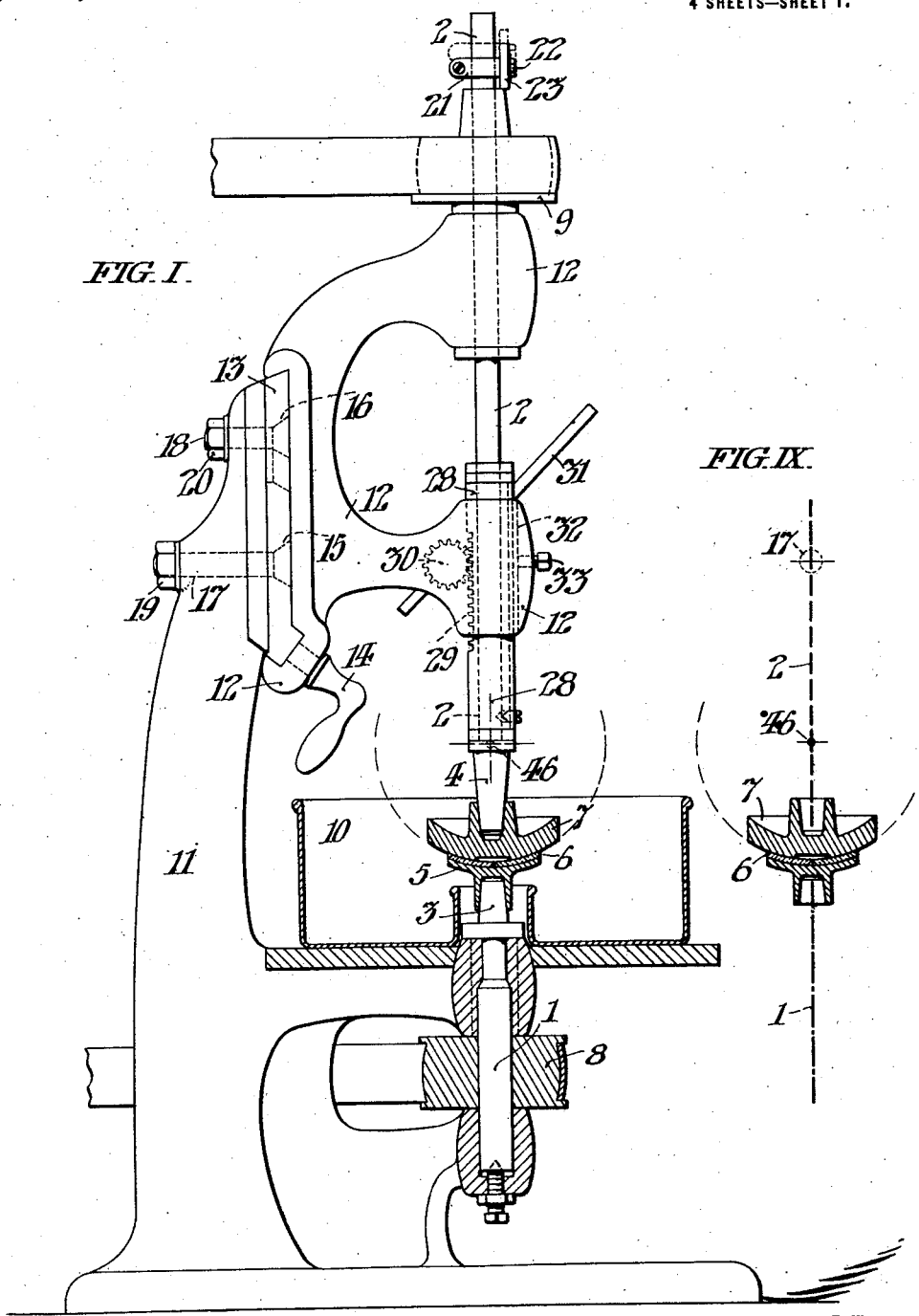

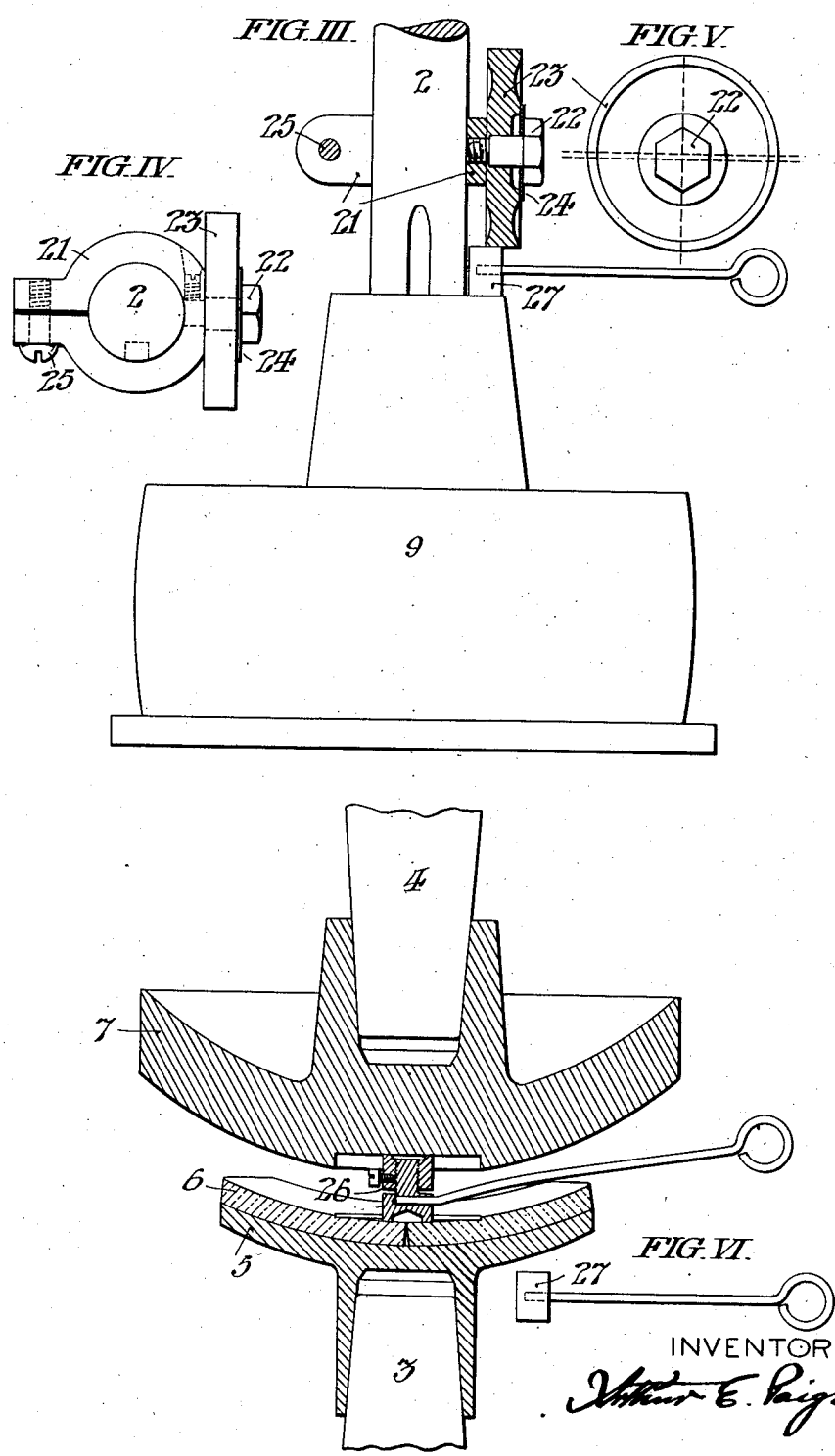

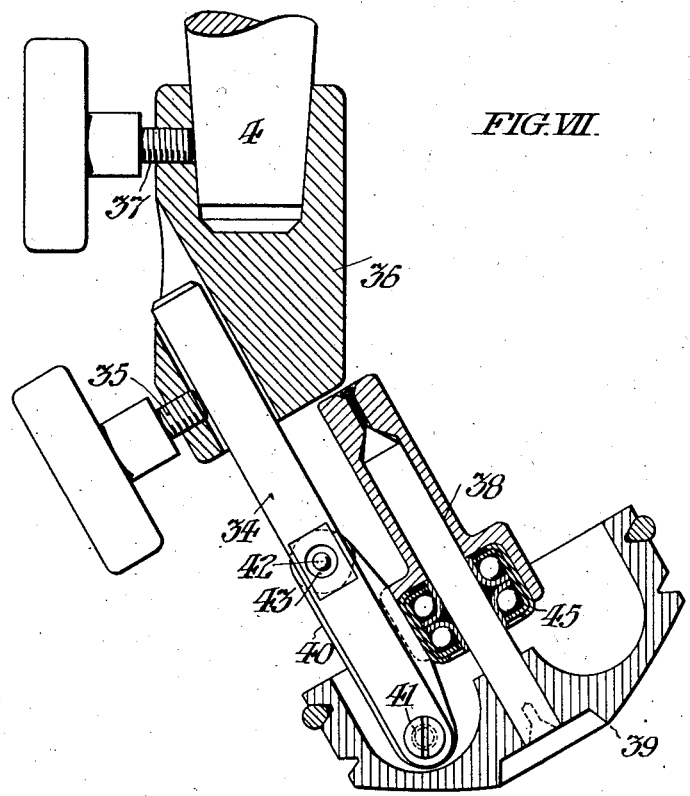
FIG.VII.
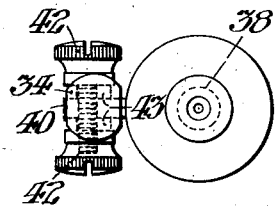
FIG.VIII.

UNITED STATES PATENT OFFICE.

ARTHUR E. PAIGE, OF PHILADELPHIA, PENNSYLVANIA.

SURFACING MECHANISM.

1,260,022.  Specification of Letters Patent.  Patented Mar. 19, 1918.

Original application filed March 4, 1915, Serial No. 12,028. Divided and this application filed July 4, 1917. Serial No. 178,523.

*To all whom it may concern:*

Be it known that I, ARTHUR E. PAIGE, a citizen of the United States, residing at Philadelphia, in the State of Pennsylvania, have invented a certain new and useful Improvement in Surfacing Mechanism, whereof the following is a specification, reference being had to the accompanying drawings.

The mechanism herein claimed may be used for surfacing ophthalmic lenses of any kind, and this application is a division of my original application Serial No. 12,028, filed March 4, 1915, for Letters Patent of the United States claiming mechanism which is particularly adapted for making bifocal lenses. The method of making bifocal lenses referred to in this application is claimed in my divisional application Serial No. 30,716, filed May 27, 1915, for Letters Patent of the United States, and specific forms of the lens grinding tools or laps referred to herein are claimed in my divisional application Serial No. 32,259, filed June 5, 1915, for Letters Patent of the United States.

As hereinafter described, my invention includes mechanism for supporting the material to be surfaced and the surfacing tools, whereby they may be relatively rotated in coöperative relation, and comprises means capable of precisely adjusting and maintaining the axes of rotation of the glass and tools in predetermined angular relation; such angular relation being variable, at the will of the operator, in accordance with the curvature of the surface which it is desired to generate; that is to say, the respective axes of rotation of the glass and surfacing tool may be selectively held in axial alinement, or parallel to each other in spaced relation, or intersecting each other at an adjustably variable angle and at an adjustably variable radius, and the tool may be rotated in concentric relation to the axis of rotation of the glass, or, the axis of rotation of the tool may intersect the surface of the glass at a point eccentric to the axis of rotation of the latter, so as to cause the tool to rotate in eccentric relation to the axis of rotation of the glass. Moreover, as said mechanism includes a rotary spindle having means arranged to carry a rotary surfacing tool with the axis of the latter eccentric to the axis of said spindle, such a tool may have a planetary movement with reference to the surface being generated or polished.

My invention includes the various novel features of construction and arrangement hereinafter more definitely specified.

In the drawings: Figure I is a left side elevation, partly in section, of a surfacing machine embodying certain features of my invention; showing the axes of rotation of the glass and tool maintained in a common plane.

Fig. II is a front elevation, partly in section, of said machine with the axes of rotation of the upper and lower spindles intersecting at the center of curvature of the tool, coinciding with the surface to be generated.

Fig. III is a fragmentary elevation, partly in section, of parts of said machine, on a larger scale, showing means for precisely predetermining the axial position of said upper spindle, for instance, for precisely variably determining the extent of the radius of the abrading face of the tool from said center of intersection of the spindle axes.

Fig. IV is a plan view of the cam wheel and its supporting collar, forming part of the mechanism shown in Fig. III, for limiting the approach of the tool to the glass.

Fig. V is a front view of said cam wheel.

Fig. VI is a side elevation of the portable gage by which said cam wheel may be manually set as shown in Fig. III.

Fig. VII is a fragmentary, partly sectional, elevation including the lower end of said axially movable upper spindle, shown in Figs. I and II, provided with means arranged to axially engage a rotary surfacing tool in variable eccentric relation, including a bar adjustable transversely to that spindle and carrying an axial bearing for the tool.

Fig. VIII is a plan view of said bar and bearing shown in Fig. VII.

Figs. IX, X and XI are diagrammatic front elevations of the machine shown in Figs. I and II; but with the opposed spindles differently adjusted. Fig. IX shows said spindles held in axial alinement. Fig. X shows them held parallel to each other, in spaced relation; and Fig. XI shows said spindles held with their axes of rotation intersecting at the center of curvature of the surface to be generated. It is to be noted that the same annular tool shown in Figs.

I, II, IX, X and XI may be used to generate a plane surface, as in Fig. X, or surfaces of different spherical curvature, as in Figs. II and XI, in accordance with the relative angular adjustment of said spindles.

In said figures; the two opposed spindles 1 and 2 are relatively angularly adjustable, and respectively axially immovable and movable, and have means, including their conical tips 3 and 4, arranged to respectively present the material to be surfaced and a surfacing tool, in opposition. Said tips are of the ordinary taper for ophthalmic tools, and the holder 5 for the glass 6, and the tool 7 fit said tips; and both are frictionally held on said spindles, and removable. Said spindles 1 and 2 are conveniently provided with means whereby they may be independently rotated, in either direction, including the wheel 8 fixed on said axially immovable spindle 1, and the wheel 9 slidably keyed on said axially movable spindle 2 which latter is longitudinally grooved as indicated in Fig. III, to engage a key. The pan 10 is normally stationary, but removable.

The means for adjusting the relative position of said spindles 1 and 2, whereby their axes of rotation may be selectively held in alinement with each other, or parallel to each other in spaced relation, or intersecting each other at an adjustably variable angle and at an adjustably variable radius with respect to said material 6, include the two frames 11 and 12 in which said spindles 1 and 2 are respectively journaled, the guide plate 13 which is fulcrumed to said frame 11 and in sliding engagement with said frame 12, transversely to the axes of said spindles, and means arranged to rigidly connect said frames in adjusted position. Said frame 12 may be rigidly secured on said plate 13, in any position of lateral adjustment, by the set screw 14. Said plate 13 has the fulcrum bolt hole 15, and the arcual slot 16 concentric to said bolt hole, and the means for rigidly connecting said frames in adjusted position include the two bolts 17 and 18 shown in Figs. I and II, extending respectively through said fulcrum bolt hole 15 and through said arcual slot 16 in said plate 13 and having conical heads fitted therein, as shown in Fig. I. Said bolts 17 and 18 extend through said frame 11, as shown in Fig. I, and have respective nuts 19 and 20; whereby said frames may be clamped in adjusted position. The lever frame plate 13 being fulcrumed on said bolt 17, and thus angularly adjustable on said stationary base frame 11, between that frame and said frame 12, to vary the relative angular position of said spindles 1 and 2, which are respectively journaled in said frames 11 and 12; I term said bolt 17 the fulcrum bolt. In view of the state of the art; it should be noted that said stationary base frame 11 is thus provided with means not only maintaining said fulcrum of the intermediate lever frame plate 13 in invariable relation with the lower, glass carrying, spindle 1; but, in fact, maintaining said fulcrum stationary while all of the adjustments of the mechanism above contemplated are being made. Moreover, said intermediate lever frame plate 13 being thus angularly adjustable with reference to said stationary fulcrum; angular adjustment of said frame 13 may be utilized to raise and lower the abrading tool, with reference to the glass, without axial movement of the tool carrying spindle 2 in the frame 12 in which it is journaled. Such construction and arrangement have the advantage that the abrading surface of the tool may be set at an adjustably variable radius with respect to the material to be surfaced, by tilting said lever plate 13 which carries it, without disturbing the adjustments of the stop mechanism for the tool carrying spindle 2. That is to say; said stop mechanism may be adjusted to precisely predetermine the extent of the axial movement to be allowed the spindle 2, and consequently, the precise depth to which the glass is to be abraded; without calibrating the tool with reference to the glass by means of the gages 26 and 27 aforesaid. In other words; the provision of means to maintain said fulcrum stationary while permitting the frame 12 to be moved laterally with respect thereto renders the extent of the radius of the abrading surface of the tool from that fulcrum variable, vertically toward and away from the material to be surfaced, independently of the freedom of the tool spindle for axial movement; and the freedom of movement of the tool spindle both laterally with reference to said fulcrum, and axially, in addition to its freedom for angular adjustment with reference to said fulcrum, materially facilitates not only the initial calibration of the tools with reference to the successive pieces of glass with which they are desired to coöperate, but also permit the constant maintenance of such predetermined calibration during the progress of the surfacing operations. The construction of the mechanism with the axis of the fulcrum bolt 17 intersecting the axis of the spindle 1, in stationary relation, affords a basis for the calculation of adjustments of the mechanism, which would not be afforded if said fulcrum was laterally movable with reference to the axis of the glass carrying spindle as in mechanism of the prior art.

The means arranged to hold said axially movable spindle 2 in predetermined axial position include the collar 21 on that spindle carrying the transversely projecting stud 22, shown in Figs. III and IV, arranged to be variably supported by the frame 12 in which that spindle 2 is journaled. Such arrangement is conveniently effected by mounting the cam wheel 23 on said stud 22, eccentrically, and frictionally engaging it by the spring washer 24 which prevents its accidental rotation but permits it to be turned by hand. Said cam wheel 23 may be set in precisely predetermined spaced relation with the upper end of the hub of said wheel 9 which rests upon the upper end of said frame 12 as shown in Fig. I. Such adjustment is conveniently effected by releasing the clamping screw 25 of said collar 21; shifting said collar to approximately the position desired; tightening said collar by said screw 25, and then turning said cam wheel 23 in accordance with the extent of axial movement of said spindle 2 which it is desired to permit. Such extent may be precisely measured by the adjustable gage 26 or the invariable gage 27 temporarily manually interposed between said wheel hub and said cam as indicated, by 27, in Fig. III.

Said spindle 2 may be manually moved axially by means of the quill 28, having the rack teeth 29 engaging the gear 30 which is journaled in said frame 12 and may be turned by the handle 31. Said quill 28 is prevented from turning in the frame 12 by the key 32 which is conveniently wedge shaped radially with respect to said spindle 2, and adjustable by the set screw 33.

As shown in Figs. VII and VIII; the means carried by said axially movable and rotary spindle 2, arranged to axially engage a rotary surfacing tool in variable eccentric relation with the axis of that spindle, includes the bar 34 which is adjustable transversely to that spindle and provided with the set screw 35, whereby it may be secured in adjusted position. I find it convenient to connect said bar 31 with said spindle 2 by means of the coupling 36 which is fitted to the conical tip 4 of said spindle, as shown in Fig. VII, and clamped thereon by the set screw 37. Said bar 31 is conveniently provided with the axial bearing 38 for the tool 39, and, said bar is bifurcated at its lower end to receive the radial flange 40 of said bearing which is pivotally connected with said bar by the screw 41 which has a smooth cylindrical portion extending through said flange but is in screw threaded engagement with said bar. The oscillatory movement of said flange in said bar is limited, and the parts clamped in adjusted relation, by the screw 42 which extends freely through the openings 43 in said bar but is in screw threaded engagement with said flange, as indicated in Fig. VIII. Of course, said tool 39 is thus adapted to rotate upon its own axis, and as said spindle 2, which carries it, is also rotated, a planetary movement is thus imparted to said tool 39 when it is presented to the glass 6 upon the holder 5. Said glass being carried by the spindle 1 in axial alinement with the spindle 2 as in Fig. IX; said tool 39 abrades an annular path upon the glass, in concentric relation with the axis of rotation of the glass but in eccentric relation to the axis of rotation of said tool upon its axis in said bearing 38; leaving a central circular area of said glass unabraded by said tool 39; said unabraded area of the glass being, of course, concentric with the axis of rotation of the latter. Such arrangement and operation may be advantageously employed in the production of bifocal lens blanks in which the minor lens field is in concentric relation with the major lens field.

As shown in Fig. VII, said axial bearing for the tool 39 includes a ball bearing 45. However, such details of construction are not of the essence of my invention, and it is to be understood that said bar may be provided with any suitable axial bearing for a rotary surfacing tool.

It may be observed that each of said surfacing tools 7 and 39 has an annular abrading surface with a central recess concentric with its axis of rotation. Such construction and arrangement not only permit the abrading surface to span the minor lens surface of a bifocal lens, without abrading such surface, while abrading the major surface of such a lens; but is advantageous in that a given surfacing tool with such an annular surface may be employed in generating spherical curves of different radii, as illustrated for instance in Figs. II and XI; provided that the axis of rotation of said tool intersects the center of curvature 46 of the surface which is being generated. That is to say, it is essential for such operation, that the axis of rotation of such an annular tool shall always intersect the center of curvature of the surface being generated and, consequently, coincide with a radius of the curvature of the surface being generated, regardless of the extent of that radius which, of course, differs with different spherical curvatures, and such variation in the angular position of the axis of the abrading tool may be effected by the means above described. Moreover, as indicated in Fig. X, such an annular surfacing tool may be used to generate a plane surface 47, by holding the axes of said spindles 1 and 2 out of axial alinement but parallel with each other. Of course, if the axis of the spindle 2 be inclined to the axis of the spindle 1, (as in Fig. XI,) while offset as in Fig. X; said axes will intersect below the surface of the glass 6, instead of above it as in Fig. XI, and a convex spherical surface may be thus generated, by the same tool 7 shown generating a plane surface in Fig. X and shown generating a concave spherical surface in Fig. XI. Moreover, by supporting a surfacing tool upon the rotary spindle 2 so as to rotate upon an axis eccentric to the axis of said spindle, as above described, toric surfaces may be generated.

Therefore, my improved surfacing mechanism, having the peculiar capacity for adjustment above described, is advantageous in that a single tool may be used therein to generate any surface of an ophthalmic lens; the nature of that surface, i. e., whether it is plane or curved, and the radius of its curvature, being predetermined by relative angular adjustment of the axes of rotation of the opposed spindles which respectively carry the surfacing tool and the material to be surfaced.

In mechanism of the class herein claimed, accuracy of the surfacing effect is dependent upon the constant maintenance of the abrading surface of the tool at a precisely predetermined radius from the center of curvature of the glass, despite the constant recession of the tool surface by the wear incident to the surfacing operation. Of course, it is also necessary to provide for the progressive relative approach of the tool and glass to compensate for the wear of both and maintain their coöperative relation. In mechanism of the prior art which most nearly approaches my present invention, the upper, tool carrying, spindle is axially immovable, and it is necessary to angularly adjust its axis of rotation, with reference to the axis of rotation of the glass, to attain the above contemplated necessary relation of the tool and glass; and the relative progressive approach of the glass and tool, necessary as the surfacing operation proceeds, is effected solely by axial movement of the lower, glass carrying, spindle, Such construction and arrangement impose serious difficulties in the practical use of that mechanism of the prior art. For instance, such progressive adjustment of the glass requires the attention of an operator at the lower end of the lower spindle, not only remote from said glass, but out of range of vision of the surface of said glass affected by such adjustment; so that two operators are required to effect such adjustment; and, although such adjustment may be effected without stopping the surfacing operation, it is, perforce, intermittently effected, whereas, it should be constantly effected to attain the maximum efficiency of the surfacing operation. Moreover, such angular adjustment of the upper spindle, (to compensate for recession, and diminishment of the effective radius, of the tool surface) cannot be effected while the mechanism is operating and is also, perforce, intermittently effected, whereas, it must be constantly effected to preserve the calibration of the tool to the required curve, and should be constantly effected to attain the maximum efficiency of the surfacing operation. Consequently, such mechanism of the prior art is not only wasteful of the operators' time, but impossible to maintain accurately operative. Therefore, it is the object and effect of my improved construction and arrangement of the mechanism appurtenant to the two opposed rotary spindles, respectively adapted to carry a glass and a surfacing tool, that all of the relative adjustments thereof, necessary to insure accuracy and rapidity of the surfacing operation, may be effected constantly; without interruption of that operation. To that end; I render the upper, tool carrying, spindle, (heretofore axially immovable,) axially adjustable to compensate not only for the aforesaid progressive diminishment in the effective radius of the tool surface coöperating with the glass, but to compensate for the progressive recession of the glass, and I am thus not only enabled to render the lower, glass carrying, spindle axially immovable, and thus eliminate one of the variable factors requiring constant attention in said mechanism of the prior art, but enable the operator to maintain the mechanism constantly accurately operative without disturbance of the angular relation of the upper, tool carrying, spindle, during the surfacing operation. Moreover, in said prior mechanism, the upper, tool carrying, spindle is angularly adjustable only upon a fulcrum which must be moved and readjusted with every transverse movement and adjustment of that spindle, and is carried by a third frame, between the two frames in which said two spindles are respectively journaled; and that intermediate frame is incapable of any angular adjustment, being only capable of movement transversely, at right angles, to the axis of the lower, glass carrying, spindle. On the contrary; I provide between the relatively adjustable frames, 11 and 12, carrying the respective spindles 1 and 2; the guide plate 13, capable of angular adjustment, as a lever, to vary the angular relation of the axes of said spindles with reference to an immovable fulcrum at 17; thus not only facilitating the relative angular adjustment of said spindles, but eliminating another variable factor of said prior mechanism, which requires the consideration of the operators in every adjustment of the tool spindle of that mechanism; and thus I simplify and facilitate the necessary calibration and adjustment of the mechanism.

In other words; the process of forming a surface of a given curvature, by said mechanism of the prior art, is rendered extremely difficult because all of the factors determining the formation of said surface are progressively variable and varying during the abrading operation, without the control of the operator. Whereas; the peculiar construction and arrangement of my invention above set forth are advantageous in that the number of variable factors is reduced to the minimum, and all of the variations are under control of the operator, during the abrading operation, and compensatory adjustments may be constantly effected without interruption of the surfacing operation.

I do not desire to limit myself to the precise details of construction and arrangement above described, as it is obvious that various modifications may be made therein without departing from the essential features of my invention as defined in the appended claims.

I claim:

1. In surfacing mechanism, the combination with two opposed spindles, respectively axially immovable and movable, having means arranged to present the material to be surfaced and a surfacing tool in opposition; of means whereby said spindles may be independently rotated, including a wheel fixed on said axially immovable spindle, and a wheel slidably keyed on said axially movable spindle; means for adjusting the relative position of said spindles, whereby their axes may be selectively held in alinement, or parallel to each other in spaced relation, or intersecting each other at an adjustably variable angle and at an adjustably variable radius with respect to said material; including two frames in which said spindles are respectively journaled, a plate which is fulcrumed to one of said frames and in sliding engagement with the other, transversely to the axes of said spindles, and has a fulcrum bolt hole and an arcual slot concentric to said bolt hole; two bolts, respectively concentric with said fulcrum and eccentric thereto, having nuts whereby said frames may be clamped in adjusted position, said bolts extending respectively through said fulcrum bolt hole and through said arcual slot; means arranged to hold said axially movable spindle in predetermined axial position, including a collar on that spindle carrying a transversely projecting member arranged to be variably supported by the frame in which that spindle is journaled; means, carried by said axially movable spindle, arranged to axially engage a rotary surfacing tool in variable eccentric relation to the axis of that spindle, including a bar adjustable transversely to that spindle, a bearing on said bar and a set screw for said bar; and a rotary surfacing tool axially engaged by said bearing.

2. In surfacing mechanism, the combination with two opposed spindles, respectively axially immovable and movable, having means arranged to present the material to be surfaced and a surfacing tool in opposition; of means whereby said spindle may be independently rotated, including a wheel fixed on said axially immovable spindle, and a wheel slidably keyed on said axially movable spindle; means for adjusting the relative position of said spindles, whereby their axes may be selectively held in alinement, or parallel to each other in spaced relation, or intersecting each other at an adjustably variable angle and at an adjustably variable radius with respect to said material; including two frames in which said spindles are respectively journaled, a plate which is fulcrumed to one of said frames and in sliding engagement with the other, transversely to the axes of said spindles, and screw means whereby said frames may be clamped in adjusted position; means arranged to hold said axially movable spindle in predetermined axial position, including a transversely projecting member arranged to be variably supported by the frame in which that spindle is journaled; and means, carried by said axially movable spindle, arranged to axially engage a rotary surfacing tool in variable eccentric relation to the axis of that spindle, including a bar adjustable transversely to that spindle, and a set screw for said bar.

3. In surfacing mechanism, the combination with two opposed spindles, respectively axially immovable and movable, having means arranged to present the material to be surfaced and a surfacing tool in opposition; of means whereby said spindles may be independently rotated, including a wheel fixed on said axially immovable spindle, and a wheel slidably keyed on said axially movable spindle; means for adjusting the relative position of said spindles, whereby their axes may be selectively held in alinement, or parallel to each other in spaced relation, or intersecting each other at an adjustably variable angle and at an adjustably variable radius with respect to said material; including two frames in which said spindles are respectively journaled, a plate which is fulcrumed to one of said frames and in sliding engagement with the other, transversely to the axes of said spindles, and screw means, whereby said frames may be clamped in adjusted position; means arranged to hold said axially movable spindle in predetermined axial position, including a transversely projecting member arranged to be variably supported by the frame in which that spindle is journaled; and means, carried by said axially movable spindle, arranged to axially engage a rotary surfacing tool in variable eccentric relation to the axis of that spindle.

4. In surfacing mechanism, the combination with two opposed spindles, respectively axially immovable and movable, having means arranged to present the material to be surfaced and a surfacing tool in opposition; of means whereby said spindles may be independently rotated, including a wheel on each spindle; means for adjusting the relative position of said spindles, whereby their axes may be selectively held in alinement, or parallel to each other in spaced relation, or intersecting each other at an adjustably variable angle and at an adjustably variable radius with respect to said material; including two frames in which said spindles are respectively journaled, a plate which is fulcrumed to one of said frames and in sliding engagement with the other, transversely to the axes of said spindles, and screw means, whereby said frames may be clamped in adjusted position; means arranged to hold said axially movable spindle in predetermined axial position, including a transversely projecting member arranged to be variably supported by the frame in which that spindle is journaled; and a rotary surfacing tool carried by said axially movable spindle, having an annular abrading surface with a central recess concentric with its axis of rotation.

5. In surfacing mechanism, the combination with two opposed spindles, respectively axially immovable and movable, having means arranged to present the material to be surfaced and a surfacing tool in opposition; of means whereby said spindles may be independently rotated, including a wheel on each spindle; means for adjusting the relative position of said spindles, whereby their axes may be selectively held in alinement, or parallel to each other in spaced relation, or intersecting each other at an adjustably variable angle and at an adjustably variable radius with respect to said material; including two frames in which said spindles are respectively journaled, a plate which is fulcrumed to one of said frames and in sliding engagement with the other, transversely to the axes of said spindles, and screw means, whereby said frames may be clamped in adjusted position; and means arranged to hold said axially movable spindle in predetermined axial position, including a transversely projecting member arranged to be variably supported by the frame in which that spindle is journaled.

6. In surfacing mechanism, the combination with two opposed spindles, relatively axially movable, having means arranged to present the material to be surfaced and a surfacing tool in opposition; of means for adjusting the relative position of said spindles, whereby their axes may be selectively held in alinement, or parallel to each other in spaced relation, or intersecting each other at an adjustably variable angle and at an adjustably variable radius with respect to said material; including two frames in which said spindles are respectively journaled, a lever plate which is fulcrumed to the frame in which the axially movable spindle is journaled and in sliding engagement with the other frame, and means whereby said frames may be clamped in adjusted position; and a rotary surfacing tool carried by one of said spindles, having an annular abrading surface with a central recess concentric with its axis of rotation.

7. In surfacing mechanism, the combination with opposed spindles, respectively axially immovable and movable, having means arranged to present the material to be surfaced and a surfacing tool in opposition; of means whereby said spindles may be rotated, including a wheel on each spindle; means arranged to temporarily detain said axially movable spindle in predetermined axial position, including a transversely projecting member carried by said spindle; and means, carried by said axially movable spindle, arranged to axially engage a rotary surfacing tool in variable eccentric relation with the axis of that spindle, including a bar adjustable transversely to that spindle, an axial bearing for the tool, carried by said bar, and a set screw for said bar.

8. In surfacing mechanism, the combination with opposed spindles, respectively axially immovable and movable, having means arranged to present the material to be surfaced and a surfacing tool in opposition; of means whereby said spindles may be rotated, including a wheel on each spindle; means arranged to temporarily detain said axially movable spindle in predetermined axial position; and means, carried by said axially movable spindle, arranged to axially engage a rotary surfacing tool in variable eccentric relation with the axis of that spindle, including a bar adjustable transversely to that spindle, an axial bearing for the tool, carried by said bar, and a set screw for said bar.

9. In surfacing mechanism, the combination with opposed spindles, respectively axially immovable and movable, having means arranged to present the material to be surfaced and a surfacing tool in opposition; of means whereby said spindles may be rotated, including a wheel on each spindle; and means, carried by said axially movable spindle, arranged to axially engage a rotary surfacing tool in variable eccentric relation with the axis of that spindle, including a bar adjustable transversely to that spindle, an axial bearing for the tool, carried by said bar, and a set screw for said bar.

10. In surfacing mechanism, the combination with opposed spindles, respectively axially immovable and movable, having means arranged to present the material to be surfaced and a surfacing tool in opposition; of means whereby said spindles may be rotated, including a wheel on each spindle; means arranged to temporarily detain said axially movable spindle in predetermined axial position, including a transversely projecting member carried by said spindle; and means, carried by said axially movable spindle, arranged to axially engage a rotary surfacing tool in variable eccentric relation with the axis of that spindle.

11. In surfacing mechanism, the combination with opposed spindles, respectively axially immovable and movable, having means arranged to present the material to be surfaced and a surfacing tool in opposition; of means whereby said spindles may be rotated, including a wheel on each spindle; and means, carried by said axially movable spindle, arranged to axially engage a rotary surfacing tool in variable eccentric relation with the axis of that spindle.

12. In surfacing mechanism, the combination with opposed spindles, respectively axially immovable and movable, having means arranged to present the material to be surfaced and a surfacing tool in opposition; of means whereby said spindles may be rotated, including a wheel on each spindle; and means, carried by said axially movable spindle, arranged to axially engage a rotary surfacing tool in eccentric relation with the axis of that spindle.

13. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; screw means arranged to hold said plate in angularly adjusted position on said base frame; a second frame mounted to slide longitudinally on said plate, transversely to the axis of said spindle; screw means arranged to hold said second frame in adjusted position on said plate; an axially movable rotary spindle mounted to rotate in said second frame; and means arranged to hold said axially movable spindle in predetermined axial position, including a collar on that spindle carrying a transversely projecting member arranged to be variably supported by the frame in which that spindle is journaled; said spindles having means arranged to present the material to be surfaced and a surfacing tool in opposition; whereby the axes of said spindles may be selectively held in alinement or parallel to each other in spaced relation, or intersecting each other at an adjustably variable angle and at an adjustably variable radius with respect to said material.

14. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; screw means arranged to hold said plate in angularly adjusted position on said base frame; a second frame mounted to slide on said plate, transversely to the axis of said spindle; screw means arranged to hold said second frame in adjusted position on said plate; an axially movable rotary spindle mounted to rotate in said second frame; and means arranged to hold said axially movable spindle in predetermined axial position, by engagement with the frame in which that spindle is journaled; said spindles having means arranged to present the material to be surfaced and a surfacing tool in opposition; whereby the axes of said spindles may be selectively held in alinement or parallel to each other in spaced relation, or intersecting each other at an adjustably variable angle and at an adjustably variable radius with respect to said material.

15. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; means arranged to hold said plate in angularly adjusted position on said base frame; a second frame mounted to slide on said plate, transversely to the axis of said spindle; means arranged to hold said second frame in adjusted position on said plate; an axially movable rotary spindle mounted to rotate in said second frame; and means arranged to hold said axially movable spindle in predetermined axial position; said spindles having means arranged to present the material to be surfaced and a surfacing tool in opposition; whereby the axes of said spindles may be selectively held in alinement or parallel to each other in spaced relation, or intersecting each other at an adjustably variable angle and at an adjustably variable radius with respect to said material.

16. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; means arranged to hold said plate in angularly adjusted position on said base frame; a second frame adjustably mounted on said plate; means arranged to hold said second frame in adjusted position on said plate; an axially movable spindle mounted to rotate in said second frame; and means arranged to hold said axially movable spindle in predetermined axial position; said spindles having means arranged to present the material to be surfaced and a surfacing tool in opposition; whereby the axes of said spindles may be selectively held in alinement or intersecting each other at an adjustably variable angle and at an adjustably variable radius with respect to said material.

17. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; means arranged to hold said plate in angularly adjusted position on said base frame; a second frame adjustably mounted on said plate; means arranged to hold said second frame in adjusted position on said plate; an axially movable spindle mounted to rotate in said second frame; said spindles having means arranged to present the material to be surfaced and a surfacing tool in opposition; whereby the axes of said spindles may be selectively held in alinement or intersecting each other at an adjustably variable angle.

18. In surfacing mechanism, the combination with a stationary base frame, of an axially immovable spindle mounted to rotate in said frame; a fulcrum bolt in said frame, in immovable relation to said spindle; a lever plate fulcrumed on said bolt; screw means arranged to hold said plate in angularly adjustable position on said base frame; a second frame mounted to slide on said plate, transversely to the axis of said spindle; screw means arranged to hold said second frame in adjusted position on said plate; an axially movable spindle mounted to rotate in said second frame; and means arranged to hold said axially movable spindle in predetermined axial position, including a collar on that spindle carrying a transversely projecting member arranged to be variably supported by the frame in which that spindle is journaled; said spindles having means arranged to present the material to be surfaced and a surfacing tool in opposition, including a bar carried by and adjustable transversely to said axially movable spindle and carrying an axial bearing for a rotary surfacing tool; whereby the axes of said spindles may be selectively held in alinement or parallel to each other in spaced relation, or intersecting each other at an adjustably variable angle and at an adjustably variable radius with respect to said material.

19. In surfacing machanism, the combination with a stationary base frame, of an axially immovable rotary spindle mounted to rotate in said frame; a fulcrum in said frame, in immovable relation to said spindle; a lever plate angularly adjustable on said fulcrum; screw means arranged to hold said plate in angularly adjusted position on said base frame; a second frame mounted to slide on said plate, transversely to the axis of said spindle; screw means arranged to hold said second frame in adjusted position on said plate; an axially movable rotary spindle mounted to rotate in said second frame; and means arranged to hold said axially movable spindle in predetermined axial position, by engagement with the frame in which that spindle is journaled; said spindles having means arranged to present the material to be surfaced and a surfacing tool in opposition, including a bar carried by and adjustable transversely to said axially movable spindle and carrying an axial bearing for a rotary surfacing tool; whereby the axes of said spindles may be selectively held in alinement or parallel to each other in spaced relation, or intersecting each other at an adjustably variable angle and at an adjustably variable radius with respect to said material.

20. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; means arranged to hold said plate in angularly adjusted position on said base frame; a second frame mounted to slide on said plate, transversely to the axis of said spindle; means arranged to hold said second frame in adjusted position on said plate; an axially movable rotary spindle mounted to rotate in said second frame; and means arranged to hold said axially movable spindle in predetermined axial position; said spindles having means arranged to present the material to be surfaced and a surfacing tool in opposition, including a bar carried by and adjustable transversely to said axially movable spindle and carrying an axial bearing for a rotary surfacing tool; whereby the axes of said spindles may be selectively held in alinement or parallel to each other in spaced relation, or intersecting each other at an adjustably variable angle and at an adjustably variable radius with respect to said material.

21. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; means arranged to hold said plate in angularly adjusted position on said base frame; a second frame mounted on said plate; means arranged to hold said second frame in adjusted position on said plate; an axially movable spindle mounted to rotate in said second frame; and means arranged to hold said axially movable spindle in predetermined axial position; said spindles having means arranged to present the material to be surfaced and a surfacing tool in opposition, including a bar carried by and adjustable transversely to said axially movable spindle and carrying an axial bearing for a rotary surfacing tool; whereby the axes of said spindles may be selectively held in alinement or intersecting each other at an adjustably variable angle and at an adjustably variable radius with respect to said material.

22. In surfacing mechanism, the combination with a stationary base frame, of an axially immovable rotary spindle mounted to rotate in said frame; a fulcrum in said frame, in immovable relation to said spindle; a lever plate angularly adjustable on said fulcrum; means arranged to hold said plate in angularly adjusted position on said base frame; a second frame mounted on said plate; means arranged to hold said second frame in adjusted position on said plate; an axially movable spindle mounted to rotate in said second frame; said spindles having means arranged to present the material to be surfaced and a surfacing tool in opposition, including a bar carried by and adjustable transversely to said axially movable spindle and carrying an axial bearing for a rotary surfacing tool; whereby the axes of said spindles may be selectively held in alinement or intersecting each other at an adjustably variable angle.

23. In surfacing mechanism, the combination with two opposed rotary spindles, respectively axially immovable and movable, having means arranged to present material to be surfaced and a surfacing tool in opposition; of means whereby the axes of said spindles may be relatively angularly adjusted to intersect at variable distances from the surface to be generated; including two relatively movable frames in which said spindles are respectively journaled; a fulcrum with respect to which the angular adjustment of said spindles is effected; one of said frames having means arranged to maintain said fulcrum stationary, intersecting the axis of the spindle in that frame, during the relative adjustment of said spindles.

24. In surfacing mechanism, the combination with two opposed rotary spindles, having means arranged to present material to be surfaced and a surfacing tool in opposition; of means whereby the axes of said spindles may be relatively angularly adjusted to intersect at variable distances from the surface to be generated; including two relatively movable frames in which said spindles are respectively journaled; a fulcrum with respect to which the angular adjustment of said spindles is effected; one of said frames having means arranged to maintain said fulcrum stationary, intersecting the axis of the spindle in that frame, during the relative adjustment of said spindles.

25. In surfacing mechanism, the combination with a stationary base frame of a spindle mounted to rotate in said frame; a fulcrum in said frame, in stationary relation to said spindle; a second frame arranged to be angularly adjusted on said base frame, with respect to said fulcrum; a spindle mounted to rotate in said second frame; one of said frames having means arranged to maintain said fulcrum stationary, intersecting the axis of the spindle in that frame, during the relative adjustment of said frames; said spindles having means arranged to present material to be surfaced and a surfacing tool in coöperative relation.

26. In surfacing mechanism, the combination with a stationary base frame, of a spindle mounted to rotate in said frame; a fulcrum in said frame, intersecting the axis of that spindle; a second frame carried by said base frame, and arranged to be angularly adjusted thereon with respect to said fulcrum; a spindle mounted to rotate in said second frame; and means whereby said angularly adjustable frame is bodily adjustable laterally with respect to said fulcrum and the axis of said first spindle; said spindles having means arranged to present material to be surfaced and a surfacing tool in coöperative relation.

27. In surfacing mechanism, the combination with a stationary base frame, of a spindle mounted to rotate in said frame; a fulcrum in said frame, intersecting the axis of that spindle; a second frame carried by said base frame, and arranged to be angularly adjusted thereon with respect to said fulcrum; a spindle mounted to rotate in said second frame; said angularly adjustable frame being bodily adjustable laterally with respect to said fulcrum; said spindles having means arranged to present material to be surfaced and a surfacing tool in coöperative relation.

28. In surfacing mechanism, the combination with a stationary base frame, of an axially immovable rotary spindle mounted to rotate in said frame; a fulcrum in said frame, with its axis intersecting the axis of said spindle, in immovable relation to said spindle; a lever plate angularly adjustable on said fulcrum; means arranged to hold said plate in angularly adjusted position on said base frame; a second frame adjustably mounted on said plate; means arranged to hold said second frame in adjusted position on said plate; an axially movable spindle mounted to rotate in said second frame; said spindles having means arranged to present the material to be surfaced and a surfacing tool in opposition; whereby the axes of said spindles may be selectively held in alinement or intersecting each other at an adjustably variable angle.

In testimony whereof, I have hereunto signed my name at Philadelphia, Pennsylvania, this third day of July, 1917.

ARTHUR E. PAIGE.

Witnesses:
 ANNA ISRAELVITZ,
 FRANK E. PAIGE.